United States Patent
Saito et al.

(10) Patent No.: US 7,308,187 B2
(45) Date of Patent: Dec. 11, 2007

(54) BAR-SHAPED LIGHT GUIDE, ILLUMINATION UNIT AND IMAGE-SCANNING DEVICE

(75) Inventors: Tomihisa Saito, Tokyo (JP); Hiroyuki Nemoto, Tokyo (JP); Makoto Ikeda, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 133 days.

(21) Appl. No.: 11/227,999

(22) Filed: Sep. 15, 2005

(65) Prior Publication Data

US 2006/0056789 A1    Mar. 16, 2006

(30) Foreign Application Priority Data

Sep. 15, 2004   (JP)   ............................. 2004-268193
May 12, 2005   (JP)   ............................. 2005-139254

(51) Int. Cl.
  *G02B 6/00*   (2006.01)
(52) U.S. Cl. ........................................ 385/147; 385/146
(58) Field of Classification Search ................ 385/133
  See application file for complete search history.

(56) References Cited

U.S. PATENT DOCUMENTS

| | | | | |
|---|---|---|---|---|
| 5,214,536 A * | 5/1993 | Prakash | ...................... | 359/633 |
| 6,178,035 B1 * | 1/2001 | Eda et al. | .................... | 359/326 |
| 6,324,330 B1 * | 11/2001 | Stites | ......................... | 385/133 |
| 6,563,609 B1 * | 5/2003 | Hattori | ....................... | 358/475 |
| 6,863,428 B2 * | 3/2005 | Lundin | ....................... | 362/551 |
| 7,068,911 B2 * | 6/2006 | Hatakoshi | .................... | 385/146 |
| 7,070,280 B2 * | 7/2006 | Edlinger et al. | .............. | 353/20 |
| 7,076,148 B2 * | 7/2006 | Nemoto et al. | ............. | 385/147 |
| 7,209,268 B2 * | 4/2007 | Ikeda | ......................... | 358/475 |
| 2005/0195618 A1 * | 9/2005 | Uemura et al. | ............. | 362/558 |

FOREIGN PATENT DOCUMENTS

| | | |
|---|---|---|
| JP | 08-163320 | 6/1996 |
| JP | 10-126581 | 5/1998 |
| JP | 11-084544 | 3/1999 |
| JP | 2954709 | 7/1999 |

* cited by examiner

*Primary Examiner*—Frank G. Font
*Assistant Examiner*—Eric Wong
(74) *Attorney, Agent, or Firm*—Carrier, Blackman & Assoc., P.C.; Joseph P. Carrier; William D. Blackman

(57) ABSTRACT

A bar-shaped light guide is provided to allow its emitting surface to be exposed from a white casing and is provided with a pattern for scattering and reflecting the light on a bottom surface opposite to the emitting surface. This pattern is formed by a white paint or minute irregularities. Further, an end face of the bar-shaped light guide opposite to the incident side is made cube-corner shaped. In other words, the end face is made chevroned by mirror-finished flat surfaces. These flat surfaces are tilted at such an angle that an incident angle $\theta$ of the rays of light traveling through the bar-shaped light guide parallel to the longitudinal direction of the bar-shaped light guide is smaller than a critical angle.

18 Claims, 7 Drawing Sheets

BAR-SHAPED LIGHT GUIDE, ILLUMINATION UNIT AND IMAGE-SCANNING DEVICE

CROSS-REFERENCE TO RELATED APPLICATIONS

The present invention claims priority under 35 USC 119 based on Japanese patent application No. 2004-268193, filed on 15 Sep. 2004, and Japanese patent application No. 2005-139254, filed on 12 May 2005. The subject matter of these priority applications is incorporated by reference herein.

BACKGROUND OF THE INVENTION

1. Field of the Invention

The present invention relates to a bar-shaped light guide adapted to allow the rays of light incident from one end face to be emitted from an emitting surface provided along the longitudinal direction, an illumination unit combining the light guide with a light emitting source, and an image-scanning device in which the illumination unit is incorporated.

2. Description of the Background Art

A bar-shaped light guide used as part of an image-scanning device such as a facsimile machine, a copying machine and a scanning device often has a light-emitting unit such as a LED disposed only on one of its ends. In the case where the light-emitting unit is disposed only on one end of the bar-shaped light guide, the number of light-emitting units is reduced and this is advantageous in terms of heat generation and costs. However, it is necessary to allow the light to be evenly emitted from an emitting surface without decreasing the intensity of illumination.

For example, Patent Document 1 discloses a bar-shaped light guide in which an end face opposite to an incident end face is mirror-finished and a member with high reflection efficiency is disposed outside the end face on the opposite side. In this manner, the light incident from one end face side, traveling through the light guide and reaching the end face on the opposite side is caused to reflect toward the incident side. By repeating this, all the incident rays of light are completely consumed as the irradiated light from a light-scattering pattern.

Patent Document 2 discloses a bar-shaped light guide in which an end face opposite to an incident end face is used as is as a rough surface to reduce manufacturing costs, while a light-scattering pattern of a section close to this end face is made wide. In this manner, a large portion of incident rays of light is consumed as scattered light before reaching the end face on the opposite side.

Patent Document 3 also disclosed a bar-shaped light guide in which an end face opposite to an incident end face is coated with a white paint to scatter the light reaching the end face. Patent Document 4 is a technical field irrelevant to the bar-shaped light guide, but discloses a reflecting mirror of a corner-cube type for retro-reflection.

In the case of a line-illuminating device (i.e., an illumination unit) used as part of an image-scanning device such as a facsimile machine, a copying machine and a scanning device, a bar-shaped light guide is often housed within a white casing. To prevent the bar-shaped light guide from being removed from the casing after once being housed or from being displaced inside the casing, configurations disclosed in Patent Documents 2 and 3 are known.

In the configurations disclosed in Patent Document 2 (see FIG. 6) and Patent Document 3 (FIG. 4), a dimple section is formed on a side surface other than a side surface where a light-scattering pattern of the bar-shaped light guide is formed. A projection formed on the inner surface of the casing is fitted into this dimple section.

[Patent Document 1] Japanese Patent Application Publication No. 8-163320
[Patent Document 2] Japanese Patent Application Publication No. 10-126581
[Patent Document 3] Japanese Patent Application Publication No. 11-84544
[Patent Document 4] Japanese Patent No. 2954709

The light guide described above is housed within a white casing to expose an emitting surface and is incorporated within an image-scanning device. The light guide is made of an acrylic resin of which the degree of transparency is high, while the casing is made of a low-cost resin.

The image-scanning device such as a facsimile machine, a copying machine and a scanning device sometimes undergoes temperature increase during transport or storage. Accordingly, when the light guide is housed within the casing, it is necessary to take the thermal expansion difference into consideration. However, if a line-illuminating device is left unattended at a high temperature and then cooled, a gap is produced between an end face of the light guide, in particular the end face opposite to a side where a light-emitting unit is disposed, and an internal surface of the casing because the light guide has a larger degree of shrinkage than the casing due to the difference in material. Such a gap is easily produced by a manufacturing error and the like as well as the difference in the coefficient of thermal expansion.

In this manner, once the gap is produced, the light which has been reflected and returned to one end side in a condition in which any gap is produced does not reflect on the end face on the opposite side, but penetrates it and is scattered on the internal surface of the casing. The scattered light is emitted from the vicinity of the end face on the opposite side. In this manner, the illumination intensity becomes abnormally high in the vicinity of the end face on the opposite side as compared with the other areas. This tendency is remarkable when the end face opposite to the light-emitting unit is mirror-finished as disclosed in Patent Document 1.

The illumination efficiency becomes worse in the structures disclosed in Patent Documents 2 and 3.

FIG. 12 is a view showing a dimple section formed on a conventional light guide as shown in Patent Documents 2 and 3. The dimple section is made rectangular or trapezoidal and its side and bottom surfaces are made flat. As a result, when the rays of light incoming from the end face of the light guide which travel through the light guide strike the side or bottom surface, the rays are easily reflected in the same direction.

FIG. 13 is a graph comparing an illumination unit according to the present invention with a conventional illumination unit as to the relationship between a main scanning direction position and an optical power by each color (red, blue, and green). The line segments P1, P2 and P3 show the optical power of each color of the conventional light guide in which a dimple section is formed in a position of 120 mm in the main-scanning direction. As is obvious from this graph, when the dimple section of a rectangular shape or a trapezoidal shape is formed, the optical power drastically rises in the vicinity of 120 mm in the main scanning direction wherein unevenness of the illumination intensity is generated in the main-scanning direction.

SUMMARY OF THE INVENTION

To solve the above-mentioned problems, a bar-shaped light guide according to a first aspect of the present invention is adapted to allow the rays of light incident from one end face to reflect on the internal surface to be emitted from an emitting surface provided along the longitudinal direction, wherein an end face of the light guide opposite to the incident surface is cube-corner shaped to totally reflect the rays of light traveling through the light guide parallel to the longitudinal direction toward the one end face.

As shown in Patent Document 4, the cube-corner shape is a shape whereby the incident light can be retro-reflected toward a light-emitting source. Specifically, the corner cube can be a chevroned shape, a pyramidal shape or a conical shape. It is to be noted that in the present invention, a surface forming the cube-corner shape needs to be mirror-finished.

A bar-shaped light guide according to a second aspect of the present invention is designed to allow the rays of light incident from one end face to reflect on the internal surface to be emitted from an emitting surface provided along the longitudinal direction, wherein the light guide is housed within a casing to expose the emitting surface, except for an end section opposite to the incident surface, and a cap covering an end face opposite to the incident surface is installed separately from the casing.

The bar-shaped light guide according to the second aspect of the invention is specifically constructed in such a manner that the end section of the light guide on which the cap is mounted protrudes from the casing or the entire light guide on which the cap is mounted is housed within the casing.

An illumination unit according to a third aspect of the present invention is provided to house a bar-shaped light guide within a casing and to allow the rays of light incident from an end face of the bar-shaped light guide to reflect on the internal surface of the bar-shaped light guide to be emitted from an emitting surface exposed in the longitudinal direction from the casing, wherein a light-scattering pattern is formed on one side surface of the bar-shaped light guide except for the emitting surface, a dimple section adapted to engage a projection formed on the internal surface of the casing is formed on a side surface of the bar-shaped light guide except for the emitting surface, the incident surface and the surface where the light-scattering pattern is formed, and a surface of surfaces forming the dimple section reflecting the rays of light traveling through the bar-shaped light guide is made curved.

With this construction, the rays of light are scattered at the dimple section to be reflected and thus, a situation where only a specific main-scanning direction position becomes bright due to the dimple section is not generated.

A white paint can be printed to form the light-scattering pattern, but it is more convenient in the present invention if the light-scattering pattern is formed by continuous or partially discontinuous irregular sections. In other words, in the case where the irregular sections are used as the light-scattering pattern, the light guide is formed by an injection molding. In this case, a trace of an ejection pin used for mold release in case of the injection molding remains whereby reflection in a certain direction is generated. However, if the trace of the ejection pin is used as the dimple section, such a disadvantage can be eliminated.

In the illumination unit according to the present invention, a light-emitting source is installed on one end of the bar-shaped light guide. Further, an image-scanning device according to the present invention comprises the illumination unit, a line image sensor consisting of a photoelectric transfer element, and an erecting unit magnification imaging system for focusing the reflected light from a document of the irradiated light from the illumination unit toward the line image sensor.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
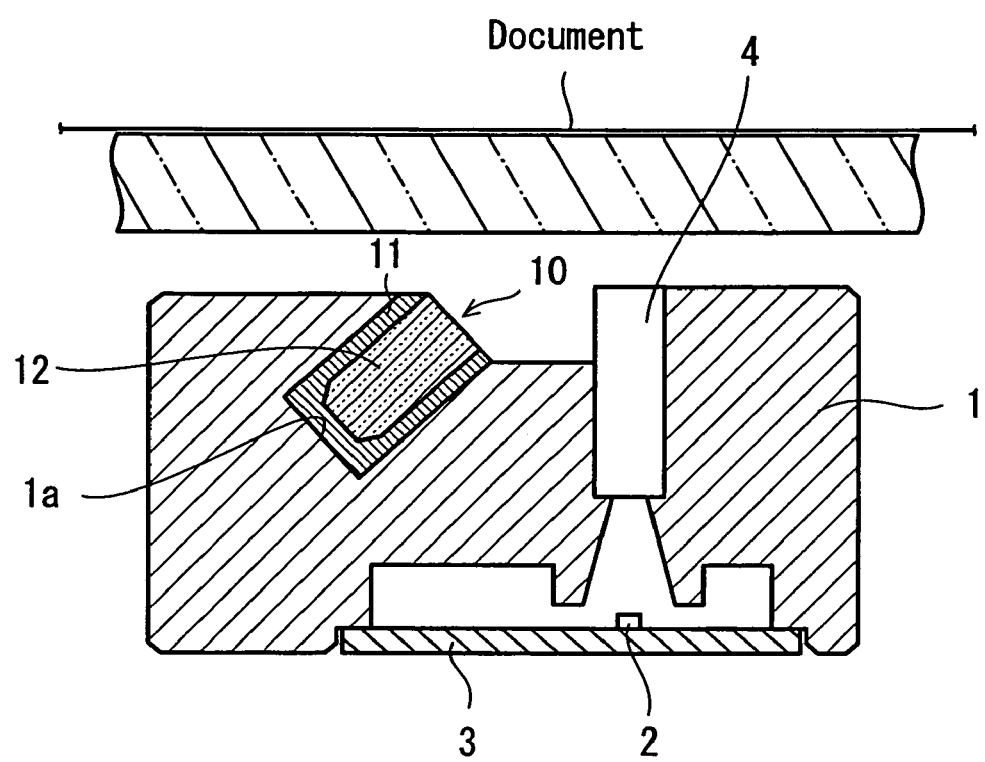
FIG. 1 is a cross-sectional view of an image-scanning device in which a bar-shaped light guide according to the present invention is incorporated.

Preferred embodiments of the present invention will now be described with reference to the accompanying drawings. FIG. 1 is a cross-sectional view of an image-scanning device in which a bar-shaped light guide according to the present invention is incorporated. In this image-scanning device, a line-shaped illumination unit 10 is disposed in a recessed section 1*a* formed in a frame 1. Mounted on the bottom section of the frame 1 is a sensor substrate 3 provided with a photoelectric transfer element (i.e., a line image sensor) 2. Further, a lens array 4 for 1:1 imaging adapted to focus the reflected light from a document of the irradiated light from the illumination unit 10 toward the photoelectric transfer element 2 is installed in the central section of the frame 1. In this manner, the illumination light emitted from the illumination unit 10 is irradiated on the document through a document table and the reflected light is detected by the line image sensor 2 through the lens array 4 to read the document. Only one illumination unit 10 is shown in the figure, but this unit can be provided in pairs.

A rod-shaped lens array is used as the lens array 4. However, a lens array can also be used in which a plurality of lens plates is superimposed to form an erecting unit magnification lens, and many minute lenses are disposed at regular intervals in a two-dimensional manner in each lens plate.

Figure 2:
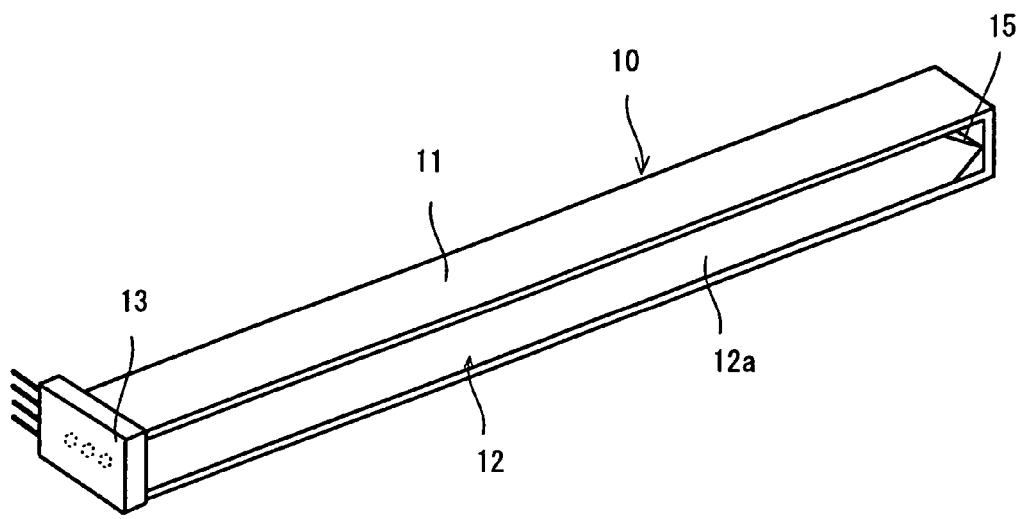
FIG. 2 is a general perspective view of an illumination unit in which a bar-shaped light guide according to a first embodiment of the present invention is incorporated.
Figure 3:
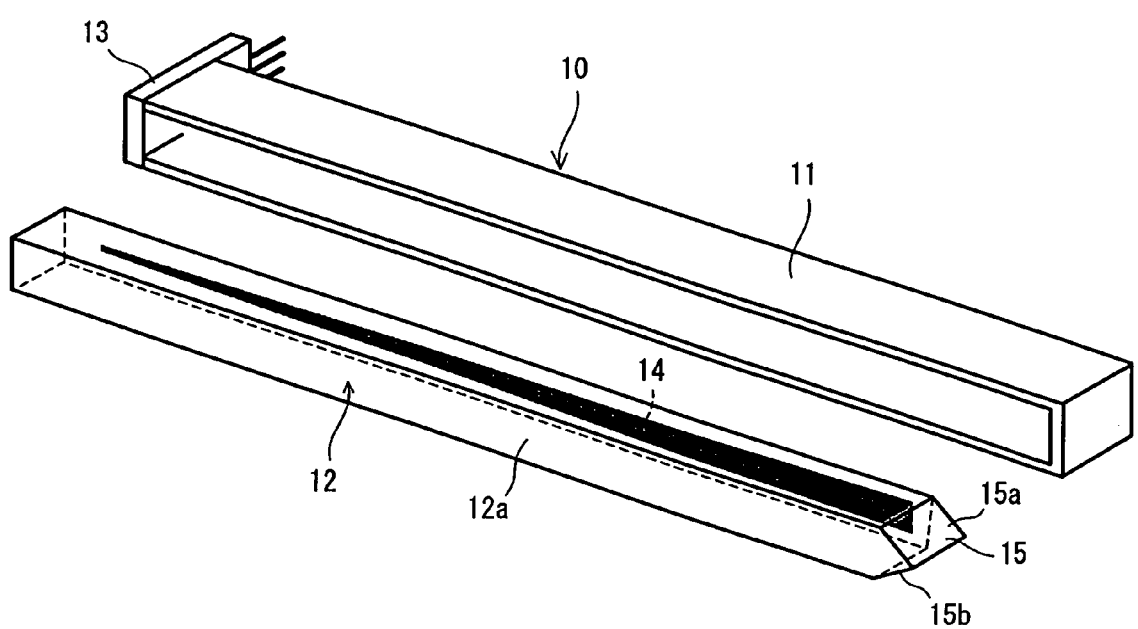
FIG. 3 is an exploded perspective view of the illumination unit of FIG. 2.

FIG. 2 is a general view of the illumination unit 10 and FIG. 3 is an exploded perspective view of the illumination unit 10. In this illumination unit 10, a bar-shaped light guide 12 which can be obtained by injection-molding a transparent resin such as an acrylic resin is housed within a white casing 11. A light-emitting unit 13 is secured to one end of the casing 11. This light-emitting unit 13 is formed to hold a LED of three primary colors on a resin plate. Each LED of three primary colors is positioned on a normal line of a bottom surface of the bar-shaped light guide 12.

The bar-shaped light guide 12 is disposed to allow an emitting surface 12a to be exposed from the white casing 11 and is provided with a pattern 14 for scattering and reflecting the light on a bottom surface opposite to this emitting surface 12a. This pattern 14 is formed by a white paint or minute irregularities such as convex portions and/or concave portions.

Figure 4:
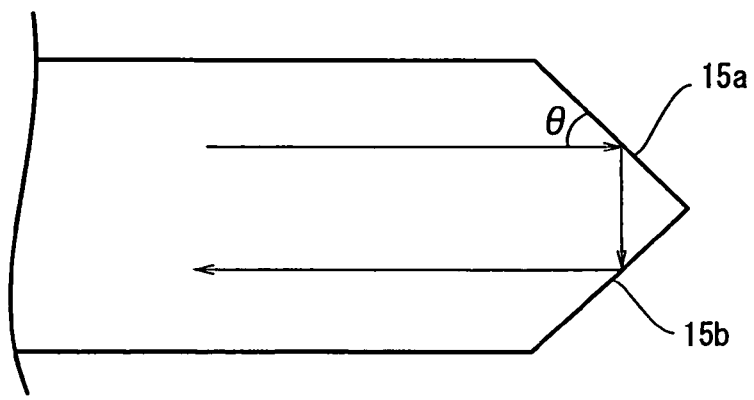
FIG. 4 is an enlarged side view of an end section of the bar-shaped light guide of FIG. 2 having a corner-cube shape.

Further, an end face 15 opposite to the incident side of the bar-shaped light guide 12 is formed to provide a corner-cube shape. As shown in FIG. 4, the end face 15 is made up of mirror-finished flat surfaces 15a and 15b. These flat surfaces 15a and 15b are tilted at such an angle that an incident angle θ of the rays of light traveling through the bar-shaped light guide 12 parallel to the longitudinal direction of the bar-shaped light guide 12 is smaller than a critical angle. For example, the flat surfaces 15a and 15b are formed to meet at right angles.

Figure 5:
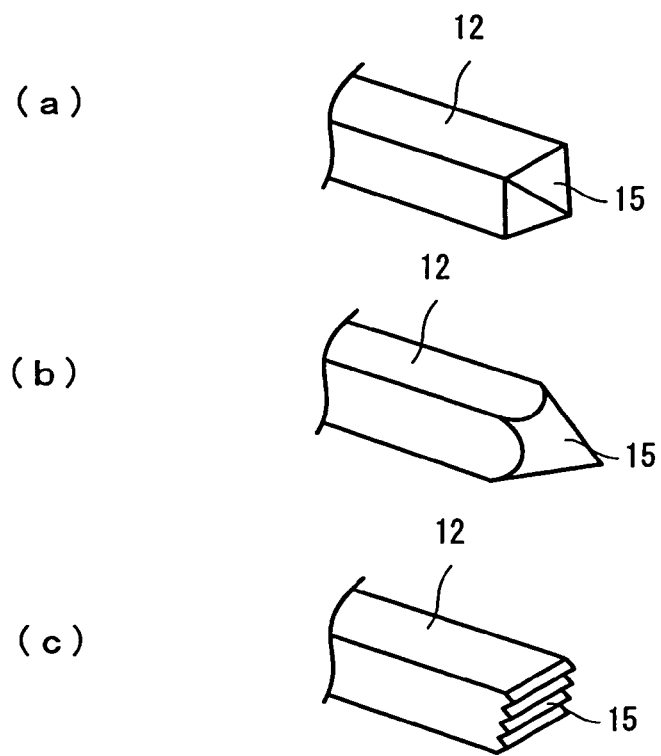
FIGS. 5(*a*) through (*c*) are perspective views showing end sections of bar-shaped light guides according to other embodiments of the invention, each having a corner-cube shape.

FIGS. 5(a) through (c) are views showing an end face shape of the light guide according to other embodiments. FIG. 5(a) shows an embodiment in which the end face 15 is a quadrangular pyramid shape. FIG. 5(b) shows an embodiment in which the end face 15 is made cone-shaped. FIG. 5(c) shows an embodiment in which the end face 15 is formed by many chevrons. In this manner, various shapes of end faces 15 can be considered, but any shape is acceptable if the end face 15 is mirror-finished and the rays of light reaching the end face 15 are totally reflected and return to one end side.

Figure 6:
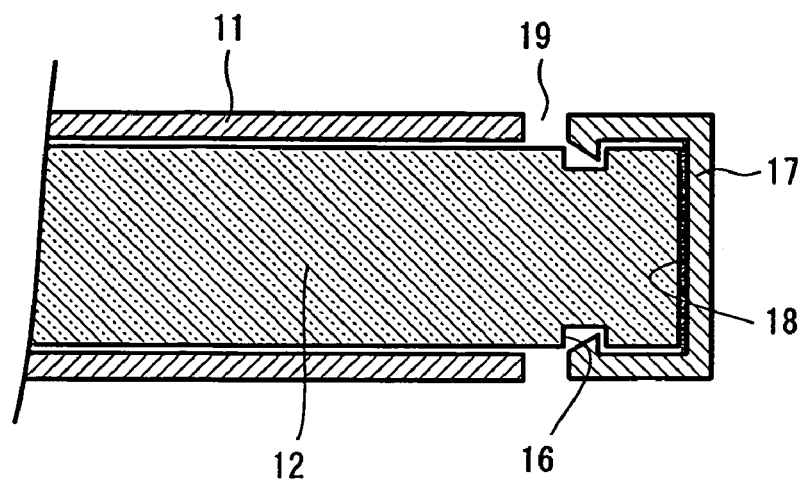
FIG. 6 is a sectional side view showing an end section of an illumination unit in which a light guide according to another embodiment of the present invention is incorporated.

FIG. 6 is a view showing an end section of an illumination unit in which a light guide according to a second aspect of the invention is incorporated. In this second aspect of the invention, an engaging section 16 is formed on an end section of a bar-shaped light guide 12 opposite to the incident side. A cap 17 is provided to engage the engaging section 16 and covers the end face 15. The cap 17 is made of a white resin or is provided with a reflecting layer 18 on the internal surface. This reflecting layer 18 contacts the mirror-finished end face 15.

A gap 19 is formed between the end section of the casing 11 housing the bar-shaped light guide 12 and the cap 17. This gap 19 is provided to prevent the cap 17 from being pressed against the casing 11 when the degree of shrinkage of the bar-shaped light guide 12 is larger than that of the casing 11 in the case where the illumination unit 10 is exposed to a high temperature and then cooled.

Figure 7:
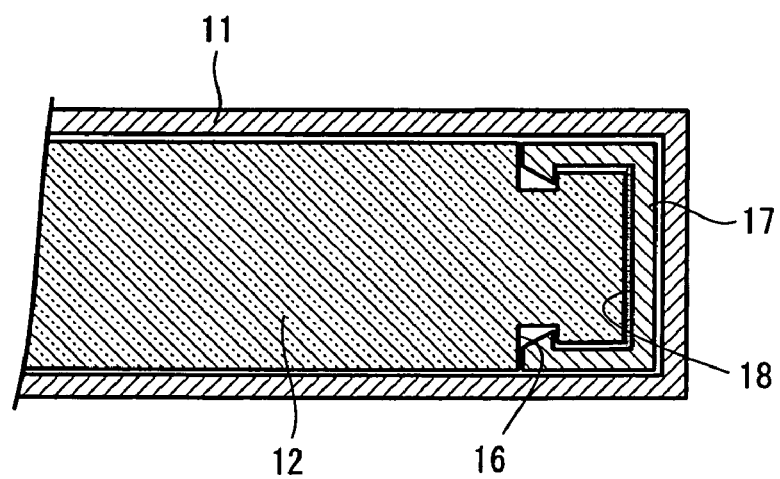
FIG. 7 is a view similar to FIG. 6 showing another embodiment of the present invention.

FIG. 7 is a view showing another embodiment of the second aspect of the invention. In this embodiment, the cap 17 is also housed within the casing 11. In this case, since the cap 17 is fixedly secured to the end section of the bar-shaped light guide 12, even though the length of the bar-shaped light guide 12 is shortened by cooling, it is possible to prevent the disadvantage that the gap is produced between the end face of the bar-shaped light guide and the internal surface of the casing as in the past and the light reflects diffusely at the gap to make the illumination intensity abnormally high at the end section.

Figure 8:
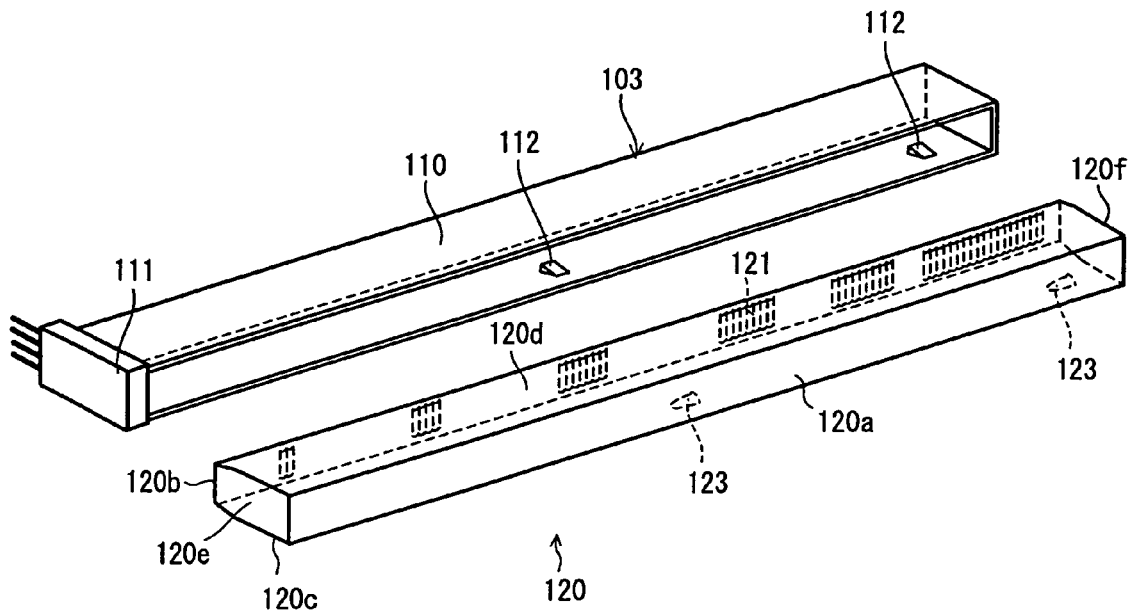
FIG. 8 is an exploded perspective view of an illumination unit according to another embodiment of the present invention.
Figure 9:
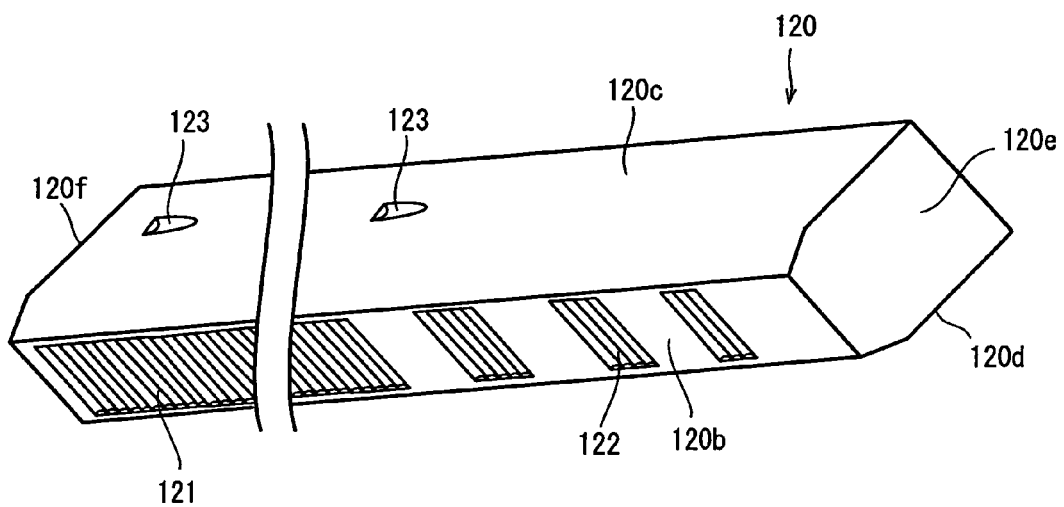
FIG. 9 is an enlarged perspective view of the light guide of FIG. 8.
Figure 10:
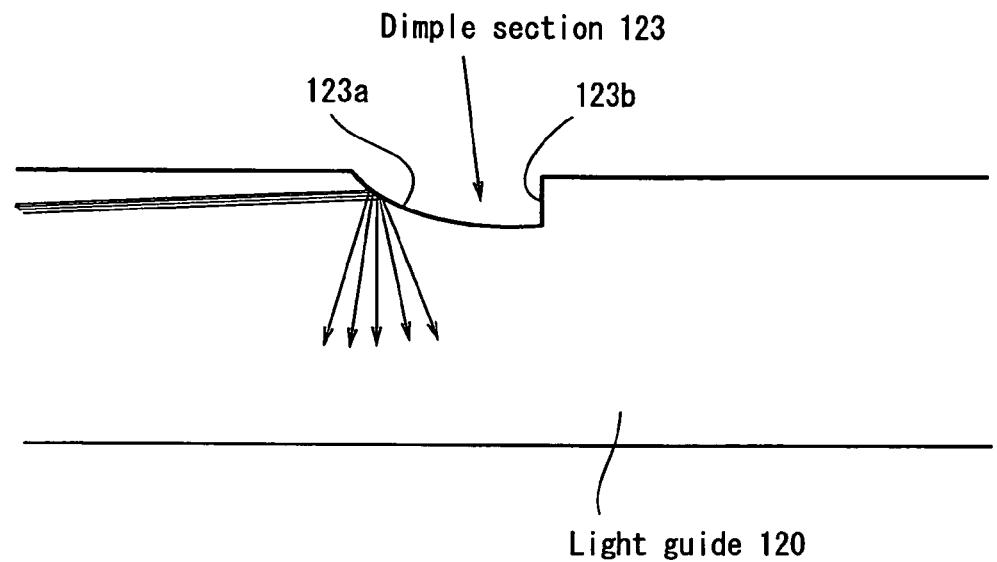
FIG. 10 is an enlarged cross-sectional view of a dimple section of the light guide of FIG. 8.
Figure 11:
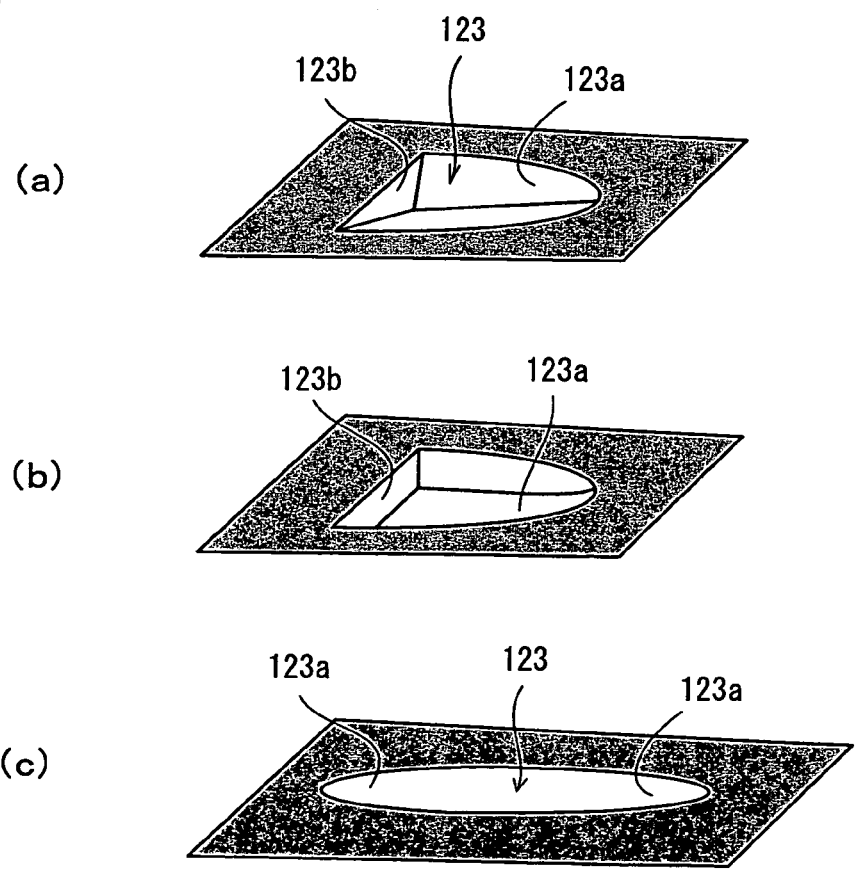
FIGS. 11(*a*) through (*c*) are views showing other embodiments of the dimple section.
Figure 12:
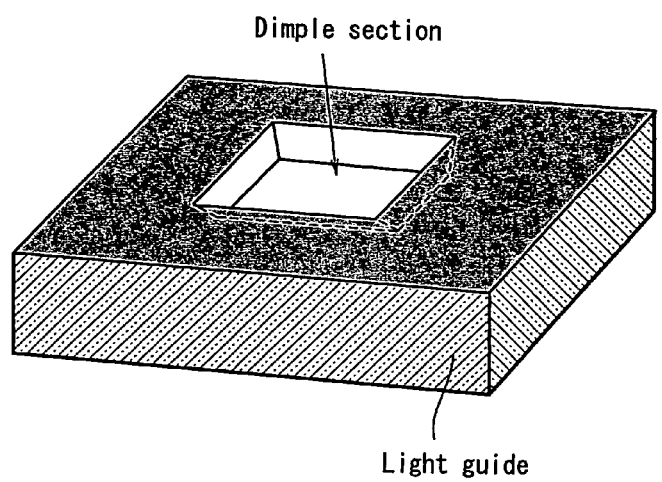
FIG. 12 is a view showing a dimple section formed on a conventional light guide.

FIGS. 8 through 11 are views explaining an illumination unit according to a third aspect of the invention. This illumination unit maybe incorporated in the image-scanning device shown in FIG. 1. FIG. 8 is an exploded view of the illumination unit and FIG. 9 is an enlarged view of a light guide. FIG. 10 is an enlarged cross-sectional view of a dimple section of the light guide. In an illumination unit 103, a bar-shaped light guide 120 which can be obtained by injection-molding a transparent resin like an acrylic resin is housed within a white casing 110. A light-emitting source 111 holding LEDs of three primary colors is secured to one end of the white casing 110.

The surface of the bar-shaped light guide 120 is composed of an emitting surface 120a exposed from the casing 110, a bottom surface 120b facing the emitting surface 120a, right and left side surfaces 120c and 120d between the emitting surface 120a and the bottom surface 120b, and both end faces 120e and 120f.

The bottom surface 120b of the bar-shaped light guide 120 is formed with a light-scattering pattern 121 for reflecting the rays of light incident from the end face 120e or 120f and for uniformly dividing the rays in the longitudinal direction. The light-scattering pattern 121 is discontinuously formed like an island on a side close to the light-emitting source 111 to make the light intensity uniform in the main-scanning direction.

Each formation area of the light-scattering pattern 121 is formed by continuing with a plurality of semi-cylindrical recessed surfaces 122. This semi-cylindrical recessed surface 122 is provided so that its axis line meets the longitudinal direction (i.e., the main-scanning direction) of the light guide at right angles. In the case where this semi-cylindrical recessed surface 122 is formed, the rays of light incident from the end face 120e are uniformly reflected toward the emitting surface 120a.

On the other hand, minute recessed spherical surfaces can also be collectively formed instead of the semi-cylindrical recessed surface 122. In this case, the rays of light incident from the end face reflect not only on the upper surface 120a serving as the emitting surface, but also on the right and left side surfaces 120c and 120d.

At least one dimple section 123 is formed on one side surface 120c of the right and left side surfaces. This dimple section 123 is provided to engage a projection 112 formed on the internal surface of the casing 110 when the bar-shaped light guide 120 is housed within the casing 110, thereby preventing the bar-shaped light guide 120 from changing position or dropping out.

A surface reflecting the rays of light traveling through the bar-shaped light guide 120 of the surfaces forming the dimple section 123 is formed to provide a curved surface 123a. In this manner, by making the reflecting surface the curved surface 123a, even in the case of the rays of light incident on the curved surface 123a at a fixed angle, the reflecting direction widely changes even though the angle is varied a little. In this manner, the light reflected from the curved surface 123a is scattered and the amount of light in the main-scanning direction is kept uniform.

FIGS. 9 and 10 show the shape of the dimple section 123. An end face 123b on the side farther from the light-emitting source 111 has a perpendicular, substantially semi-circular shape, while the curved surface 123a has a spindle-shape narrowed toward the light-emitting source 111. Further, as shown in FIG. 11(a), the end face 123b may instead have a triangular shape, while the curved surface 123a has a spindle-shape with a ridge line. Referring to FIG. 11(b), the end face 123b may instead have a quadrangular shape and the curved surface 123a has a shape bent only in the thickness direction of the bar-shaped light guide 120 and narrowed at the tip. In FIG. 11(c), the end face 123b is not provided, but there are curved surfaces 123a on both ends. Further, a shape discontinuing or cutting the tip section (i.e., the section on the side of the light-emitting source 111) of each curved surface 123a shown above on its way can also be considered. The dimple section 123 shown in FIG. 11(c) is useful for the illumination unit in which the light-emitting source 111 is provided on both ends of the casing 110.

In an example shown in the figure, the dimple section 123 is provided at two places of a substantially central section of the bar-shaped light guide in the main-scanning direction and the vicinity of an end section on a side farther from the light-emitting source 111. However, the dimple section 123 can be provided at two places of a substantially central section and the vicinity of an end section on a side close to the light-emitting source 111, at three places of a substantially central section and both end sections, at two places of only both end sections, or only at a substantially central section.

Figure 13:
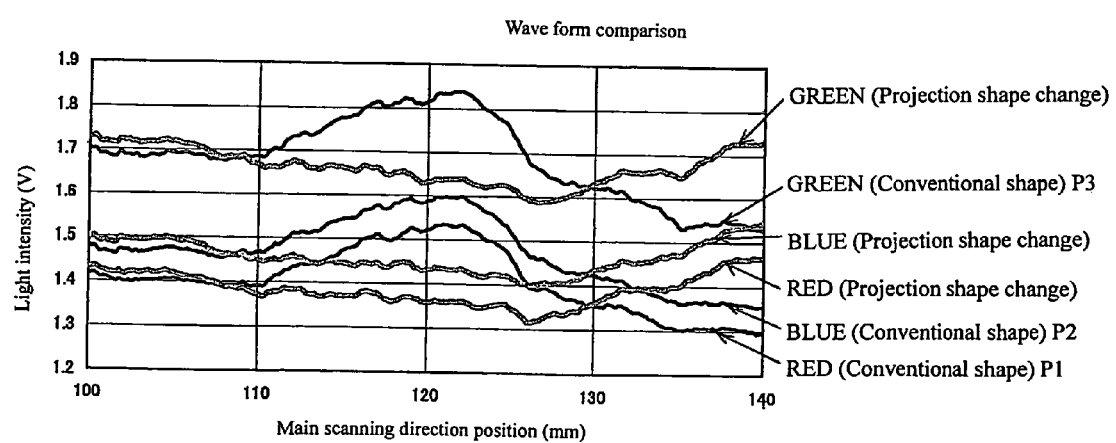
FIG. 13 is a graph comparing the illumination unit according to an embodiment of the present invention with a conventional illumination unit as to the relationship between a main-scanning direction position and a light intensity by each primary color (red, blue, green).

FIG. 13 is a graph comparing the illumination unit according to the third aspect of the present invention with a conventional illumination unit as the relationship between a main-scanning direction position and an optical power by each color. As is obvious from this graph, it is to be noted that the illumination intensity of the light guide according to the present invention is extremely uniform in the main-scanning direction as compared to the conventional light guide.

It is also possible to apply the dimple section 123 for engagement of the third aspect of the present invention to the light guide of the first aspect of the present invention in which the end face is made corner-cubed or to the light guide of the second aspect of the present invention in which the end face opposite to the incident surface is covered by a cap.

In this manner, the uniformity of the amount of light from the emitting surface along the main-scanning direction improves further.

EFFECTS OF THE INVENTION

According to the bar-shaped light guide according to the first aspect of the present invention, it is possible to provide uniform illumination intensity from the emitting surface provided along the longitudinal direction. In particular, a conventional light guide in which a light-emitting unit is disposed only on one end has such a tendency that the illumination intensity becomes abnormally high at the end section opposite to the end section where the light-emitting unit is disposed because of the shrinkage due to the temperature change. According to the present invention, the irradiated light traveling to the end section on the opposite side does not scatter there, but returns again toward the one end. Thus, the irradiated light is uniformly scattered in the longitudinal direction in a light-scattering pattern provided on the bottom surface and the like of the light guide.

According to the bar-shaped light guide according to the second aspect of the present invention, it is possible to prevent the illumination intensity from becoming extremely high at the end face opposite to the light-emitting unit because no gap is produced between the end face of the bar-shape light guide and the casing even though a temperature change is generated.

Further, according to the third aspect of the present invention, a dimple section for engagement which was responsible for the non-uniformity of the amount of light in the main-scanning direction up to now can be positively utilized for the uniformity of an amount of light in the main-scanning direction.

INDUSTRIAL APPLICABILITY

Although there have been described what are the present embodiments of the invention, it will be understood by persons skilled in the art that variations and modifications may be made thereto without departing from the gist, spirit or essence of the invention. The scope of the invention is indicated by the appended claims.

What is claimed is:

1. A bar-shaped light guide configured to allow rays of light incoming from one end face to reflect on internal surfaces and to be emitted from an emitting surface provided to extend along a longitudinal direction of the light guide, wherein an end face of the light guide opposite to the one end face is formed to provide a cube-corner shape so that the rays of light traveling through the light guide parallel to the longitudinal direction are totally reflected toward the one end face.

2. The bar-shaped light guide according to claim 1, wherein the corner-cubed shape is mirror-finished.

3. A light illuminating unit comprising a bar-shaped light guide configured to allow rays of light incoming from one end face to reflect on internal surfaces and to be emitted from an emitting surface provided to extend along a longitudinal direction of the light guide, a casing which houses the light guide to expose the emitting surface except for an end section opposite to the one end face, and a cap covering an end face opposite to the incident surface and installed separately from the casing.

4. The light illuminating unit according to claim 3, wherein the end section of the light guide on which the cap is mounted protrudes from the casing.

5. The illumination unit according to claim 3, further comprising a light-emitting source installed on one end side of the bar-shaped light guide corresponding to said one end face.

6. An illumination unit comprising: a bar-shaped light guide within a casing and to allow rays of light incoming from an end face of the bar-shaped light guide to reflect on internal surfaces of the bar-shaped light guide to be emitted from an emitting surface exposed to extend in a longitudinal direction of the light guide from the casing, wherein a light-scattering pattern is formed on one side surface of the bar-shaped light guide except for the emitting surface, at least one dimple section adapted to engage a corresponding projection formed on the inner surface of the casing is formed on a side surface of the bar-shaped light guide except for the emitting surface, the one end face and the surface where the light-scattering pattern is formed, and a surface of surfaces forming the dimple section reflecting the rays of light traveling through the bar-shaped light guide is curved.

7. The illumination unit according to claim 6, wherein the dimple section is formed on a trace of an ejection pin left after injection-molding the bar-shaped light guide.

8. An image-scanning device comprising the illumination unit according to claim 5, a line image sensor consisting of a photoelectric transfer element, and an erecting unit magnification imaging system for concentrating the light reflected from a document of the light irradiated from the illumination unit toward the line image sensor.

9. The bar-shaped light guide according to claim 2, wherein the corner-cubed shape is one of a chevroned, pyramidal and conical shape.

10. The light illuminating unit according to claim 3, wherein the entire light guide on which the cap is mounted is housed within the casing.

11. The bar-shaped light guide according to claim 1, wherein one end side of the bar-shaped light guide corresponding to said one end face has a light-emitting source installed thereon.

12. An image-scanning device comprising the illumination unit according to claim 6, a line image sensor consisting of a photoelectric transfer element, and an erecting unit magnification imaging system for concentrating the light reflected from a document of the light irradiated from the illumination unit toward the line image sensor.

13. An image-scanning device comprising the illumination unit according to claim 7, a line image sensor consisting of a photoelectric transfer element, and an erecting unit magnification imaging system for concentrating the light reflected from a document of the light irradiated from the illumination unit toward the line image sensor.

14. The bar-shaped light guide according to claim 1, wherein the light guide is a single unitary member.

15. The light illuminating unit according to claim 3, wherein an end face of the light guide opposite to the one end face is formed to provide a cube-corner shape so that the rays of light traveling through the light guide parallel to the longitudinal direction are totally reflected toward the one end face.

16. The light illuminating unit according to claim 15, wherein the corner-cubed shape is mirror-finished.

17. The illumination unit according to claim 6, wherein an end face of the light guide opposite to the one end face is formed to provide a cube-corner shape so that the rays of light traveling through the light guide parallel to the longitudinal direction are totally reflected toward the one end face.

18. The illumination unit according to claim 17, wherein the corner-cubed shape is mirror-finished.

* * * * *

UNITED STATES PATENT AND TRADEMARK OFFICE
CERTIFICATE OF CORRECTION

PATENT NO. : 7,308,187 B2
APPLICATION NO. : 11/227999
DATED : December 11, 2007
INVENTOR(S) : Saito et al.

It is certified that error appears in the above-identified patent and that said Letters Patent is hereby corrected as shown below:

<u>Column 1</u>:
    Line 9, change "patent application" to -- Patent Application --.
    Line 10, change "patent application" to -- Patent Application --.
    Line 22, change "light emitting" to -- light-emitting --.
    Line 29, change "such as a LED" to -- such as an LED --.

<u>Column 2</u>:
    Line 67, change "main-scanning" to -- main scanning --.

<u>Column 3</u>:
    Line 50, change "main-scanning" to -- main scanning --.

<u>Column 4</u>:
    Line 46, change "main-scanning" to -- main scanning --.

<u>Column 5</u>:
    Line 16, change "to hold a" to -- to hold an --.
    Line 43, change "fonned by" to -- formed by --.

<u>Column 6</u>:
    Line 11, change "unit maybe" to -- unit may be --.
    Line 34, change "main-scanning" to -- main scanning --.
    Line 40, change "main-scanning" to -- main scanning --.
    Line 67, change "main-scanning" to -- main scanning --.

<u>Column 7</u>:
    Line 4, change "spindle-shape" to -- spindle shape --.
    Line 8, change "spindle-shape" to -- spindle shape --.
    Line 22, change "main-scanning" to -- main scanning --.
    Line 34, change "main-scanning" to -- main scanning --.
    Line 37, change "in the main-" to -- in the main --. (Delete the hyphen after "main".)
    Line 47, change "main-scanning" to -- main scanning --.

UNITED STATES PATENT AND TRADEMARK OFFICE
CERTIFICATE OF CORRECTION

PATENT NO. : 7,308,187 B2
APPLICATION NO. : 11/227999
DATED : December 11, 2007
INVENTOR(S) : Saito et al.

It is certified that error appears in the above-identified patent and that said Letters Patent is hereby corrected as shown below:

Column 8:
    Line 6, change "bar-shape light guide" to -- bar-shaped light guide --.
    Line 11 and line 13, change "main-scanning" to -- main scanning --.
    After line 15 ("INDUSTRIAL APPLICABILITY"), insert the following paragraph:
    -- A bar-shaped light guide according to the present invention can be effectively used as an image-scanning device such as a copying machine and a facsimile machine. --.
    Line 37, change "A light illuminating unit" to -- A line-illuminating unit --.
    Line 46, change "The light illuminating unit" to -- The line-illuminating unit --.

Column 9:
    Line 12, change "pyramidal and conical" to -- pyramidal, and conical --.
    Line 13, change "The light illuminating unit" to -- The line-illuminating unit --.

Column 10:
    Line 8, change "The light illuminating unit" to -- The line-illuminating unit --.
    Line 15, change "The light illuminating unit" to -- The line-illuminating unit --.

Signed and Sealed this

Twenty-fourth Day of June, 2008

JON W. DUDAS
*Director of the United States Patent and Trademark Office*